Oct. 9, 1951 P. J. QUINN 2,570,484
VARIABLE PITCH PROPELLER
Filed April 29, 1948 3 Sheets-Sheet 1
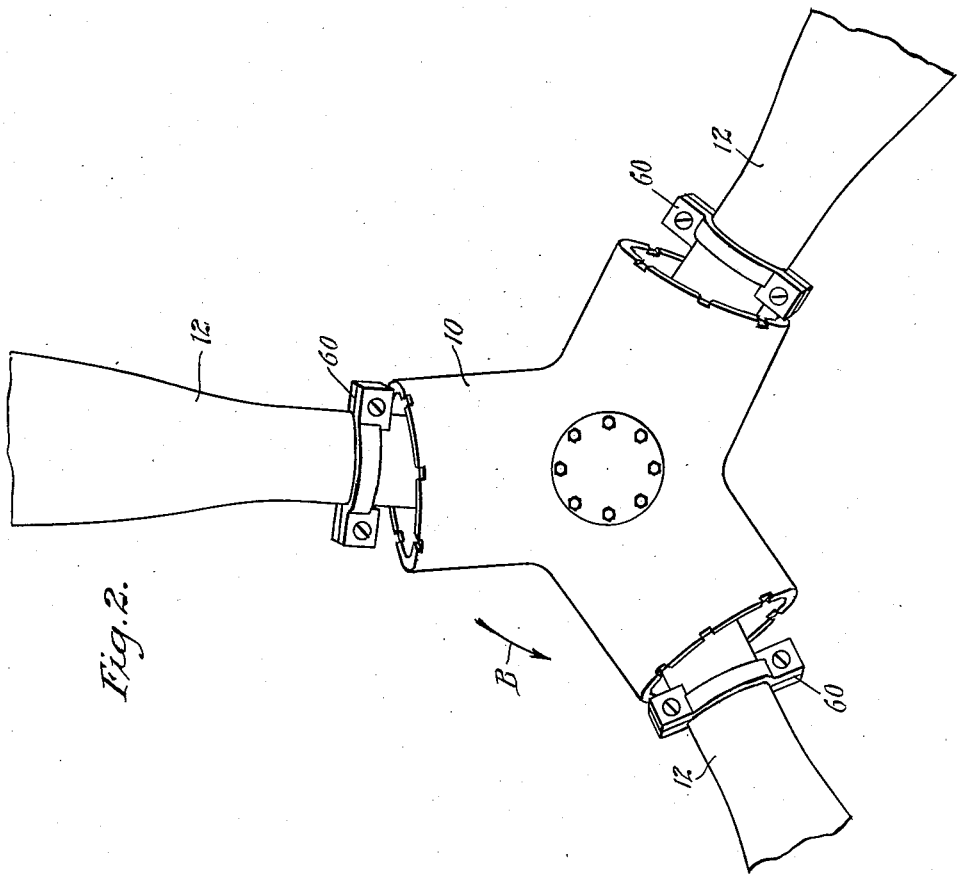
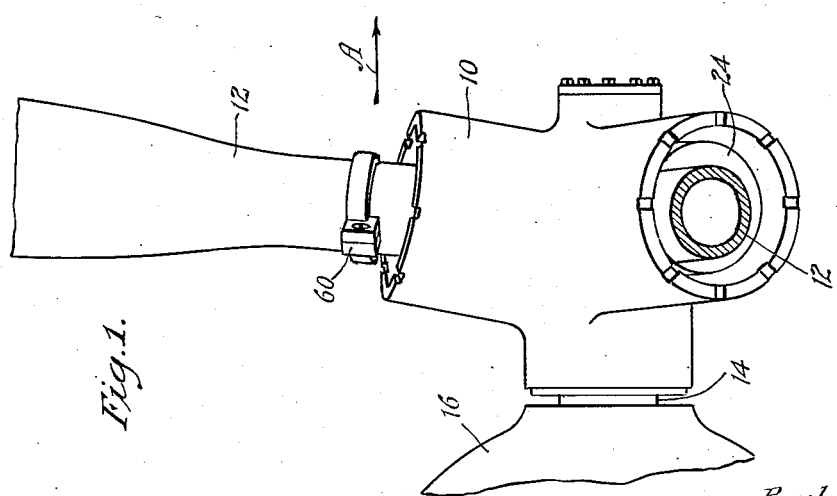
INVENTOR.
Paul J. Quinn
BY
ATTORNEY Oct. 9, 1951 P. J. QUINN 2,570,484
VARIABLE PITCH PROPELLER
Filed April 29, 1948 3 Sheets-Sheet 2
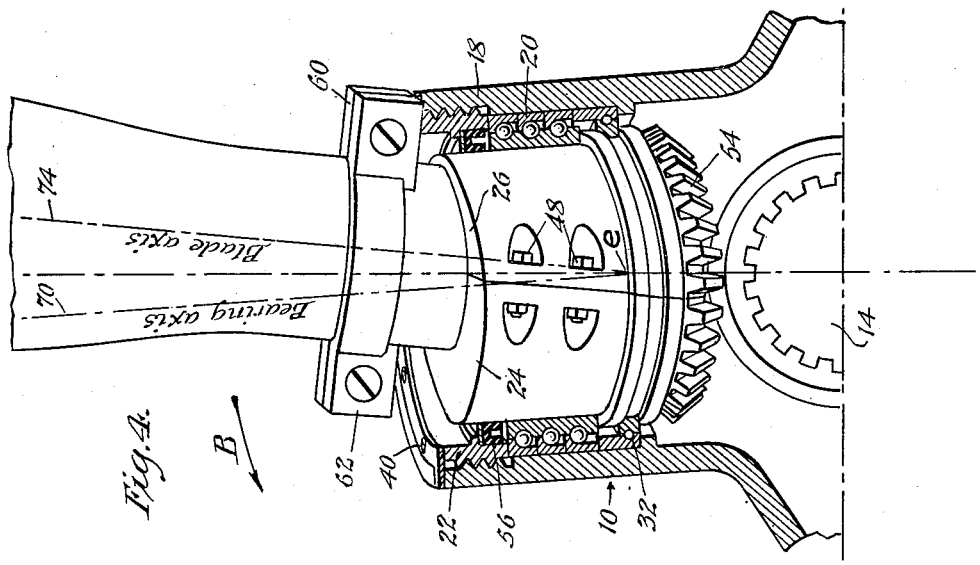
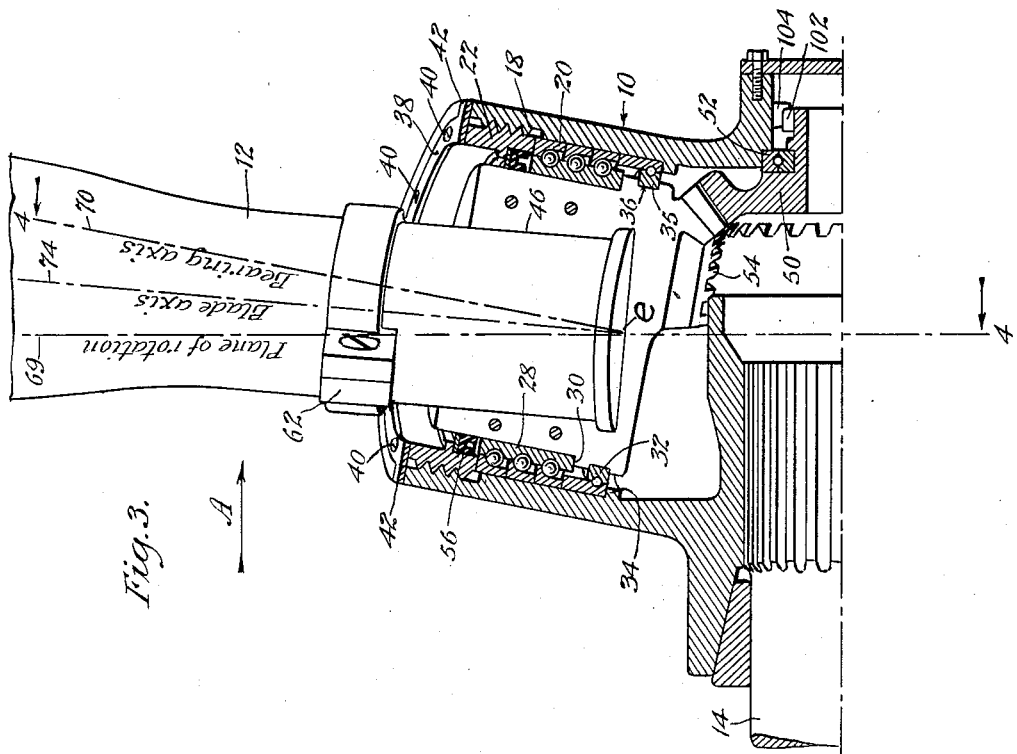
INVENTOR.
Paul J. Quinn
BY
ATTORNEY

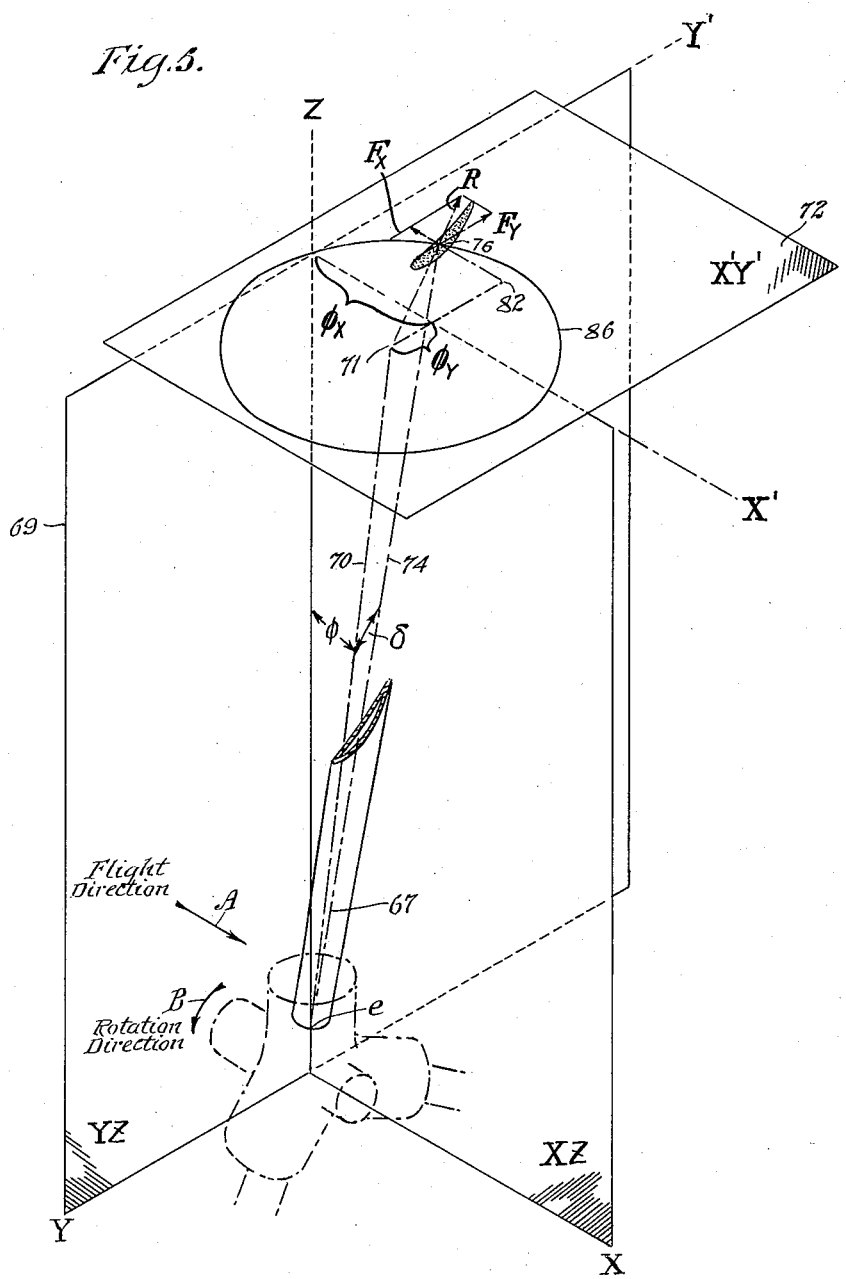

Patented Oct. 9, 1951

2,570,484

UNITED STATES PATENT OFFICE 2,570,484

VARIABLE PITCH PROPELLER

Paul J. Quinn, South Orange, N. J.

Application April 29, 1948, Serial No. 23,909

2 Claims. (Cl. 170—160.57)

This invention relates to variable pitch propellers for aircraft and more particularly to variable pitch propellers employing aerodynamic and centrifugal forces for automatically controlling the pitch. The application for patent herein comprises a continuation-in-part of application Serial No. 705,971, filed October 26, 1946, which has become abandoned.

Variable pitch propellers have been proposed in which the aerodynamic forces and centrifugal force are utilized to maintain or effect changes in pitch in response to propeller rotational speed and airstream velocity. Such prior propellers operate in response to relatively small turning forces and against relatively high frictional resistance to turning, with the inherent result that such propellers have not had the desired sensitivity and stability, both being important and basic requirements for satisfactory operation.

Accordingly, an object of the present invention is to provide an automatic variable pitch propeller in which the aerodynamic forces employed for effecting pitch changes or for maintaining a desired pitch are relatively high and in which the individual blades are retained upon anti-friction bearings offering low resistance to turning in response to the forces present.

Another object of the invention is the provision of an automatic variable pitch propeller operated by centrifugal and aerodynamic forces in which the blade offset is relatively small and in which the blade center of gravity is readily maintained well within the area encompassed by the blade retention bearings.

A further object of the invention is to provide an automatic variable pitch propeller in which the blade bending moments are minimized and in which the forces tending to hold the propeller blade in any pitch position within the operating range are of substantially equal magnitude.

Still another object of the invention is the provision of a propeller of the type described in which the blades extend more closely radially of the rotation axis and in which adequate aerodynamic and centrifugal turning moments and stability are nevertheless attained as well as enhanced.

A further object of the invention is to provide a variable pitch blade retention in which the blade axis extends at an angle to the axis of pitch rotation of the blade with respect to its hub, and in which the pitch rotation axis is inclined to the normal in order to increase the effectiveness of the aerodynamic forces within the normal range of pitch variation.

A further object of the invention is the provision of an automatic variable pitch propeller in which feathering of the propeller may occur when propeller rotation is stopped, and in which the degree of feathering may be readily controlled to provide or retain a sufficient turning moment to re-establish rotation.

The above and other novel features of the invention will appear more fully hereinafter from the following detailed description when taken in conjunction with the accompanying drawings. It is expressly understood, however, that the drawings are employed for purposes of illustration only and are not designed as a definition of the limitation of the invention, reference being had to the appended claims for this purpose.

In the drawings wherein like reference characters indicate like parts:

Fig. 1 is a side elevation of a three blade propeller hub having blade shanks extending therefrom in accordance with the invention;

Fig. 2 is a front elevation of the propeller shown in Fig. 1;

Fig. 3 is substantially an axial section taken through the socket of one of the blades of Figs. 1 and 2, the section extending through the intersection of the retention bearing and blade neutral axes there shown;

Fig. 4 is a transverse section taken substantially on the line 4—4 of Fig. 3, bent at e and following the plane of rotation in part and the retention bearing axis in part, the blade shank and retention collar element being shown in elevation; and Fig. 5 is a three dimension diagram of a propeller and blade illustrating generally the forces and couples acting under normal flight conditions at a point approximately three-quarters of the blade radius from the hub.

Referring to Figs. 1 through 4, there is shown a propeller hub 10 having blades 12 retained therein and driven by an engine shaft 14 projecting from an engine nose, housing or fuselage such as 16. The hub 10 is provided with a plurality of tubular blade sockets 18 extending to a substantial degree radially of the hub but inclined at an angle to the normal as will be more fully explained. Each of the blade sockets is provided with a plurality of retention thrust bearings 20 which bear against retention nuts 22 internally threaded within the end of each socket. The retention thrust bearings 20 support within each socket, a split blade holding collar composed of parts 24 and 26, having a cylindrical thrust bearing receiving surface 28 and a shoulder 30 against which the thrust bearings 20 bear.

A bearing 32 opposing the retention bearings 20 is provided between the split collar and the socket near the base thereof in order to slightly preload the bearings 20 and hold the blade in proper position when not rotating. The retention thrust bearings 20 and pre-load bearing 32 are clamped in position within the socket against a shoulder 34. The internal race 35 of the bearing 32 may be split to facilitate its positioning within a channel 36 provided therefor in the shoulder 30 of the split collar. The retention nut 22 may be securely locked in position by means of a ring 38 secured to the nut 22 by screws 40, the ring having lugs 42 engaging slots 44 formed by the castellated end of each socket. The split collar members 24 and 26 are provided with a suitable blade shank receiving recess and are adapted to be snugly clamped about the shank of the blades 12 by means of recessed clamp bolts 48.

Journalled within the hub and co-axial with the axis of hub rotation is a bevel gear 50 supported on a bearing 52. A sector bevel gear 54 provided upon the collar members 24 and 26 in each of the sockets, meshes with the co-axial gear 50, in order to synchronize the movements of all blades and pool the turning moments, although it will readily appear that if all blades and their retentions are exactly alike, the need for such synchronizing gear may be eliminated.

The hub is splined upon the engine drive shaft 14 and the cavity in which the bevel gears are positioned is adapted to be supplied with lubricant, which is prevented from escaping through the blade sockets by means of a ring seal 56 held in position by a flange on the retaining nut 22, the split collar and retention nut.

It will be observed in Figs. 3 and 4 that the split collars securing the shank of the blades 12 therewithin, support each of the blades with the blade axis extending at an angle to the axis of the retention bearing contained within each hub socket. The blade axis is positioned at an angle $\delta$ to the retention bearing axis and lies rearwardly of and trails the bearing axis, it being assumed that the flight direction of the propeller is in the direction of arrow A in Fig. 3, and the direction of rotation of the hub is indicated by the arrow B in Fig. 4. The blade neutral axis and retention bearing axis converge at a point indicated at $e$, which point is located at a distance from the shaft axis as may be determined in any particular design. The plane of rotation indicated in Fig. 3 is taken so as to pass through the point $e$ and will hereinafter be referred to as the plane of rotation. The axis of the retention bearing is inclined forwardly of the plane of rotation by an angle $\phi_x$ and also in advance of the direction of rotation by an angle $\phi_y$, thus forming a total angle $\phi$ between a radial lying in the plane of rotation and extending through the point $e$, and the thrust bearing axis.

Since the axis of rotation of each split collar is the retention bearing axis and is askew to the propeller shaft axis, the bevel gear 50 and mating gears 54 are suitably cut for skew gear engagement. In order to neutralize the effect of the centrifugal twisting moment of each blade, there may be mounted upon the shank of each blade a pair of opposed counterweights 60 and 62, the weights being so clamped as to extend perpendicular to the major axis of the blade airfoil section at substantially the center of pressure, herein assumed to be at about .75 of the blade radius.

The forces available to effect pitch changes in a propeller of the type thus far described are (1) those components of centrifugal force which act upon the blade in a direction normal to the blade axis and which tend to pull it into the plane of rotation such as YZ (Fig. 5) passing through the blade mounting point $e$, and which are utilized to increase propeller pitch, and (2), thrust and torque forces, generally alluded to as aerodynamic forces, tending to drag the blade rotationally behind a normal to the propeller shaft passing through the blade mounting point and tending to move the blade forwardly of the plane of rotation, and which are utilized to decrease propeller pitch. The present scheme utilizes a propeller geometry which makes maximum use of these forces.

In order more clearly to observe the operating forces present in and resulting from the arrangement of the blade, a three dimensional diagram is provided in Fig. 5 wherein the blade neutral axis 74 is at an angle $\delta$ to the retention bearing axis 70, and the retention bearing axis 70 is at an angle $\phi$ to a radius extending through the point $e$. The plane XZ is a vertical fore and aft plane passing through the axis of rotation. The YZ plane is the plane of rotation taken through the point $e$ and lying normal to the axis of rotation. The plane X'Y' is a plane parallel to the axis of rotation and normal to the other two, and passes through the blade neutral axis 74 at three-quarters of the blade radius. This plane actually is a spherical segment but may be considered as as a plane since the various angles to be discussed are small and the assumption of the use of the plane introduces only negligible errors. Similarly, the eccentricity of the point $e$ from the shaft axis being slight is also disregarded as introducing no noticeable error.

As previously noted the propeller is so constructed that the retention bearing axis 70 intersects the blade neutral axis 74 at the point $e$. The intersection of the retention bearing axis 70 at the plane X'Y' or 72, is at 71. The intersection of the blade neutral axis 74 with the plane 72 is at 76 and embracing the point 76 is a representation of the propeller blade cross-section. The point 71 so far as the plane 72 is concerned represents the center about which the blade section and its center of gravity 76 may rotate in a circular orbit 86, by reason of the angle $\delta$ between the bearing axis and the blade neutral axis. In virtue of the forward offset and of the offset in the direction of rotation of the bearing axis 70 with respect to a radius such as the Z axis, this offset bearing represented by the angle $\phi$, the angle $\phi$ may be resolved into a forward angular component $\phi_x$ and a lateral angular component $\phi_y$ in the direction of rotation whereby the point 71 lies forward of the YZ plane and advanced rotationally with respect to the XZ plane. $\phi$ and $\delta$ may be constructed according to the requirements of the propeller, within a range of 3 to 15 degrees, and to attain objectives of this invention, $\delta$ will be made somewhat greater than $\phi_x$ and thereby, the circular locus 86 of the blade section center of gravity 76 lies predominantly forward of the YZ plane but also overlaps rearwardly of the YZ plane as shown.

It is further noted that when the angle $\delta$ is fairly small, the locus of the blade center of gravity may be maintained within the area embraced by the thrust bearing annulus 20 when projected upon the plane 72. This assures a bearing loading which is reasonably uniform throughout its periphery.

It will be seen that the blade section center of gravity 76 lies in a quadrant of the circle 86 which is behind the circle center 71 and rotationally in retard with respect to the direction of rotation. The radius 71—76 on the plane 72 makes an angle $\alpha$ relative to a line 71, 82 which is parallel to the Y axis. This angle $\alpha$ is normally of the order of 45 degrees and varies either side thereof through one-half of the tolerable operating pitch range of the propeller blade. Correspondingly, a tangent to the circle 86 at the point 76 or a chord intersecting the circle 86 at the normal operating pitch limits will lie in the range of 45 degrees to the Y axis.

With a propeller blade and bearing system designed so that the blade section takes an operating position as shown and with the angles $\delta$ and $\phi$ relatively small, the bending moments upon the blade proper are minimized. The stabilizing and pitch changing forces upon the blade, due to centrifugal and aerodynamic effects, yield pitch increasing and decreasing forces of the same order of magnitude and may likewise be maximum in value. The blade attains an equilibrium condition when the resultant R of centrifugal and aerodynamic forces in the plane 72 is a continuation of the line 71, 76. R may be resolved into a fore and aft component $F_x$ and a lateral component $F_y$. Since the moment arms 71, 82 and 76, 82 are of the same order of magnitude and since the forces $F_x$ and $F_y$ are essentially of the same order of magnitude, moments for increasing pitch and moments for decreasing pitch will be of the same order of magnitude to provide high sensitivity for pitch increase or decrease, and concurrently will provide stable equilibrium when the moments due to $F_x$ and $F_y$ are equal, to attain a fixed pitch position.

Changes in the values of $F_x$ and $F_y$ will occur as a result of the change in the R. P. M. and thus centrifugal force, a change in air speed or thrust, and a change in torque. In automatic propeller constructions of the prior art, it may be noted that the geometry of the systems is such that pitch change forces and, reciprocally, the moment arms upon which those forces act, are of widely divergent orders of magnitude, yielding low sensitivity and a low degree of stability with respect to propeller pitch change. It is believed that, in the present invention, the optimum geometry for the system has been chosen to secure the best possible sensitivity and stability.

Examples of the mode and characteristics of operation of the propeller under assumed conditions are cited as follows. If pitch equilibrium occurs with an engine R. P. M. of 2200 and an air speed of 60 miles per hour, propeller pitch may be of the order of 13 degrees as shown, under which conditions, the moments due to forces $F_x$ and $F_y$ would be equal and the resultant R acting upon the blade would comprise a continuation of the radius 71, 76. If the air speed were to slacken to 40 miles per hour and propeller power were increased with a consequent speed increase to 2400 R. P. M., conditions which would be appropriate at takeoff, the force R will shift forward or clockwise, whereby $F_y$ will increase relative to $F_x$ imposing a moment upon the blade, rotating it forwardly around the circle 86 to a decreased pitch position where the moments due to the forces $F_x$ and $F_y$ will again balance. In the new position the blade still lies in the lagging rearward quadrant of the circle 86 and the forces and moment arms to obtain balanced moments are still of the same order of magnitude. If engine power and aircraft attitude be changed to secure a flight speed of 100 M. P. H. at an R. P. M. of 2000, which conditions might be desired during a sustained flight phase, a higher propeller blade pitch angle would be called for to absorb engine power and to provide an appropriate angle of attack. With the new conditions, R would shift rearwardly or counterclockwise, and $F_x$ would increase relative to $F_y$ (thrust decreasing and R. P. M. increasing whereupon centrifugal effect dominates) thereby imposing a moment upon the blade to swing it rearwardly in the quadrant in the circle 86 to an increased pitch position until the moments due to $F_x$ and $F_y$ balance whereupon the resultant R becomes a continuation of the radius 71, 76. From the above assumed examples, it should be clear that the blade will respond in pitch change to variations in R. P. M., air speed and other factors.

When a uniform phase of operation is to be maintained, the propeller will change pitch to maintain constant R. P. M., if the transient changes in centrifugal or aerodynamic forces occur on the propeller. For instance, a transient increase in air speed permits higher R. P. M.—the higher R. P. M. causes a pitch increase to restore R. P. M. to normal. The speed regulation, which depends upon the sensitivity of the blade to unbalanced forces, is particularly good in this propeller because of the advantageous geometry enabling relatively large pitch correcting moments to be built up for a small deviation in pitch from that at which aerodynamic and centrifugal forces balance.

In case of engine failure in operation, the propeller R. P. M. decreases and the relative wind acts against the forward faces of the blades to increase pitch to feather them. A feathering stop may be placed in the hub at a point to yield a feathering blade pitch angle of any desired value, such as 75 degrees. The feathering angle preferably should be flat enough to leave some windmilling torque on the engine for restarting it, but steep enough so as not to cause undue drag. A stop is also placed in the hub to limit low pitch to that desired for takeoff, and if desired, a selectively releasable stop may be used to limit the high pitch angle of the propeller during normal powered flight. In virtually all automatic propellers of this general type, the blades operate very close to the plane of rotation due to the dominance of centrifugal force over aerodynamic forces. The blade is usually about 2 to 4 degrees ahead of the plane of rotation. In this propeller, by designing it to have the conical locus of the blade overlap the plane of rotation by a few degrees, the blade's travel in its orbit, for normal operation, is controlled to the part of the rear, trailing quadrant of the cone which lies at approximately 45 degrees to the plane of rotation. This is the part of the orbit, as previously inferred, where maximum effectiveness for producing pitch changing moments is derived from both the centrifugal and aerodynamic forces, respectively, for increasing and decreasing pitch.

Without the proper relation of forward tilt $\phi_x$ and angle $\delta$, $\delta$ being slightly greater than $\phi_x$, as herein taught the stabilizing forces $F_x$ and $F_y$ become very different in magnitude and concurrently, the moment arms through which these forces act become different, with a consequent loss of sensitivity to adjust pitch on account of small changes in aerodynamic, centrifugal and other forces imposed upon the propeller.

In practice it may be found desirable to employ counterweights 60 to compensate for blade centrifugal twisting moment. However, since the normal range of pitch variation in the propeller is of the order of about 8 degrees, the centrifugal twisting moment will vary slightly over such range. Centrifugal twisting moment tending to reduce blade pitch toward zero may be overcome in this small range either by increasing forward tilt of the thrust bearing axis 70 slightly, or by changing the angle of the blade chord with respect to the radius 71, 76.

Analytical evaluation of the propeller herein described is not covered in this specification but it is known that both mathematical and graphical methods of analysis may be utilized to select proper values of angles $\delta$, $\phi$, $\phi_x$ and $\phi_y$ with respect to the dimensional characteristics of the system and in conjunction the weight of the blade, the moment of inertia of the blade, the power to be absorbed and the air speed range over which the propeller is intended to operate. An example of a propeller organization may be cited wherein the propeller diameter is of the order of 6', the blades are of wood and each weight about 6 pounds. Such blades have a moment of inertia of about .2 slug feet squared, a mounting center eccentricity $e$ of 1", a blade center of gravity located about 12" from such mounting center, a tilt angle $\phi_x$ of about 7 degrees, an offset angle $\phi_y$ of about 3 degrees, and an angle $\delta$ of about 9 degrees. Such a propeller would be suitable for operation in the range of 2000 to 2400 R. P. M. on aircraft having a speed range of about 40 to 100 miles per hour and on engines having power of the order of 75 H. P.

A larger and heavier blade made of metal would require a smaller eccentricity $e$ and the angles $\phi_x$, $\phi_y$ and $\delta$ would be decreased to obtain desirable characteristics for larger engines and faster airplanes.

As will be clear from the foregoing, a relatively simple variable automatic pitch propeller is provided by this invention, in which the blades readily respond to changes in air speed, engine power and propeller speed to effect proper corresponding changes in pitch setting of the propeller blades. Further, the invention provides a system in which great stability is provided in pitch setting under conditions where no transient force changes exist. The mountings of the blades are such as to provide a minimum of resistance to the forces used for maintaining or changing pitch setting in accordance with flight conditions. Thus, pitch changes are made gradually upon changes in transient conditions with a minimum of overswing and with a minimum of lag.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. In a variable pitch propeller comprising a hub, a socket on said hub for the support of a blade, said socket containing a bearing having an axis intersecting a hub radius in the plane of hub rotation at a point spaced outwardly on said radius from the hub center, and said bearing axis being sloped forwardly from said radius in the direction of flight and being sloped rotationally in advance of said radius, the angle of the bearing axis with said radius being of the order of 5 to 15 degrees, a blade supported by said bearing and extending outwardly from said hub, the neutral axis of said blade intersecting said hub radius at its intersection with said bearing axis, the blade neutral axis being angled relative to the bearing axis by an angle of the order of 5 to 15 degrees, said blade being mounted for free swinging in said bearing in a conic path about said bearing axis, means to limit the free swinging of said blade to an angular range of the order of 15 degrees between minimum and maximum pitch positions of the blade, said range being the operating pitch range of the blade, said blade axis, when the blade is in a median pitch position, lying forward of the plane of rotation of the hub radius toward the direction of flight and lying in a rotationally trailing position relative to said hub radius.

2. A variable pitch propeller according to claim 1 wherein, in the operating pitch range, a plane defined by said blade neutral axis and said hub radius makes an angle of substantially 45 degrees with the plane of rotation of said hub radius.

PAUL J. QUINN.

REFERENCES CITED

The following references are of record in the file of this patent:

UNITED STATES PATENTS

| Number | Name | Date |
|---|---|---|
| 1,455,442 | Leparmentier | May 15, 1923 |
| 1,872,337 | Pillard | Aug. 16, 1932 |
| 2,359,265 | Hackethal | Sept. 26, 1944 |
| 2,416,516 | Everts | Feb. 25, 1947 |
| 2,423,752 | Biermann | July 8, 1947 |

FOREIGN PATENTS

| Number | Country | Date |
|---|---|---|
| 496,750 | Great Britain | Dec. 5, 1938 |
| 886,632 | France | July 5, 1943 |